Nov. 19, 1968  R. L. BINSLEY ET AL  3,411,292
RESONANT COMBUSTOR TYPE GAS TURBINE ENGINE
Filed Sept. 1, 1966  3 Sheets-Sheet 1
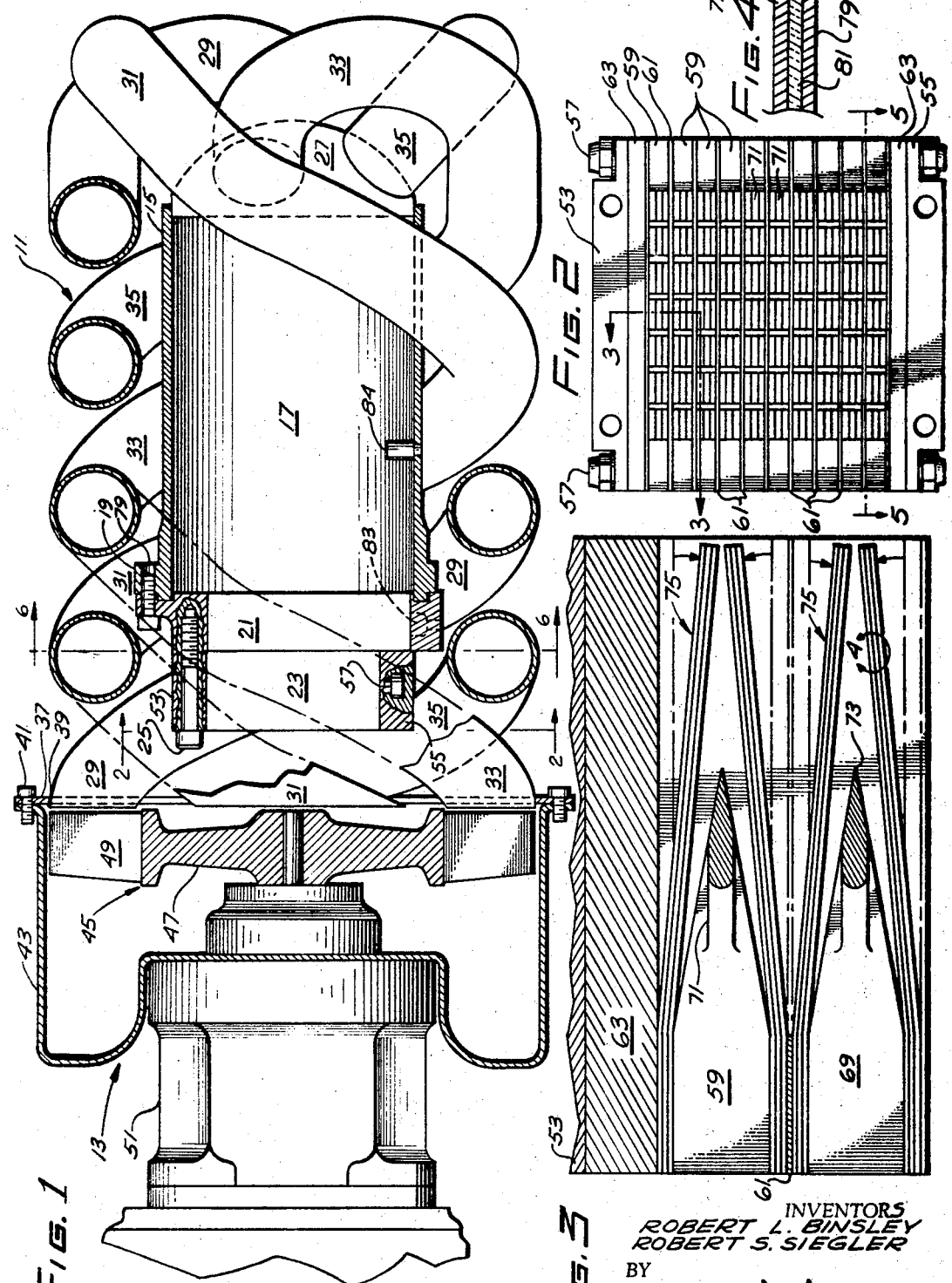
INVENTORS
ROBERT L. BINSLEY
ROBERT S. SIEGLER
BY
Stuart W. Wohlgemuth
ATTORNEY

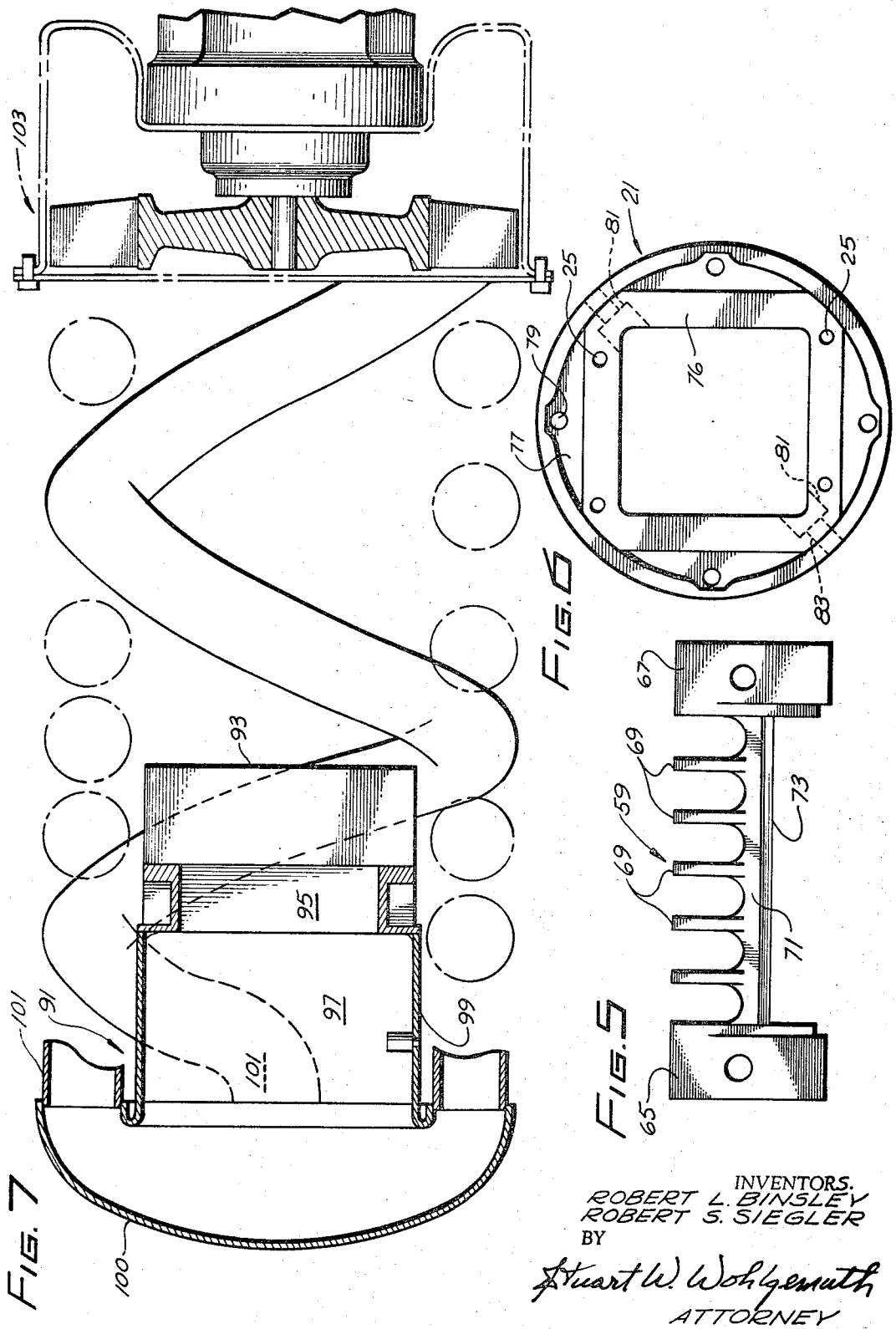

INVENTORS
ROBERT L. BINSLEY
ROBERT S. SIEGLER
BY
Stuart W. Wohlgemuth
ATTORNEY

United States Patent Office 3,411,292
Patented Nov. 19, 1968

3,411,292
RESONANT COMBUSTOR TYPE GAS TURBINE ENGINE
Robert L. Binsley, Sepulveda, and Robert S. Siegler, Hidden Hills Calabasas, Calif., assignors to North American Rockwell Corporation
Filed Sept. 1, 1966, Ser. No. 576,726
9 Claims. (Cl. 60—39.77)

ABSTRACT OF THE DISCLOSURE

A pulse-jet type turbine engine is disclosed consisting of a cylindrical housing defining a combustion chamber which has air and fuel supply at one end and multiple exhaust tubes at the other, said tubes being acoustical in length, wound about said housing, and arranged to exhaust into a turbine rotor located at said one end.

---

This invention relates to a new pulse-jet combustor. More specifically, the invention relates to a novel pulse-jet combustor, having multiple outlets, and its utilization with regard to starting turbines. In co-pending application, S.N. 380,174, filed July 3, 1964, now abandoned, there is disclosed an apparatus and method for starting turbines. As pointed out in that application, a large class of turbine starters relate to the utilization of a small starter turbine which is connected to the output pad of the main turbine through a gear-box drive. Various means are used for starting the small gas turbine. The application discloses the concept of utilizing at least one resonant combustor situated adjacent the starting turbine so that the exhaust gases from the combustor are directed against the blades of the starter turbine. This resonant combustor is also known as a pulse-jet.

As shown in the specific examples of the co-pending application with regard to the drawings therein, two pulse-jet combustors were utilized, each combustor having a combustion chamber and an outlet elongated tube which was directed to the turbine. These combustors utilized were of essentially conventional design. The peculiar features involved with the combustor structure itself was the fact that the outlet tube was twisted around the main body of the combustor so as to make a compact unit. However, even so, the presence of at least two combustors presented a fairly large, heavy weight package. Additional disadvantages of the previous device related to having only two exit tubes, thus the gas was directed to two points on the surface of the turbine, generally 180° apart. In other words, the arc of admission of the gases from the combustors in the prior device was small. As will be shown, the efficiency of a turbine is greatly increased by increasing the arc of admission of the working gases. Additionally, the single tube combustors inherently provide a large exit for the hot gases leaving the tube. Because of this, to maximize the benefit of these hot gases, the blade height of the starter turbine must closely correspond to the diameter of the exit tube of the combustor. In the prior device, the blade height of the turbine blades was larger than desired. Thus, the ability to decrease the blade height would in turn increase the efficiency of the turbine as is well known to those skilled in the art.

Thus, it is an object of this invention to provide a novel resonant combustor for utilization in a compact arrangement in combination with a turbine.

A further object of the invention is to provide a novel resonant combustor which when used in combination with a turbine will increase the arc of admission of hot gases to the turbine.

A further object of the invention is to provide a novel resonant combustor which when used in combination with a turbine will decrease the blade height of the turbine blades as compared to prior art devices.

The above and other objects of the invention are accomplished by the novel combustor which has a plurality of outlet tubes extending from the main combustion chamber. The novel combustors of this invention have more than one exit tube which extends from the combustor which may be spiraled around the combustor body in a length sufficient to achieve the desired combustion effects of the combustor. For example, in one embodiment the combustor is comprised of a normal inlet valve, injector and main cylindrical combustion chamber. The combustion chamber is then terminated in a dome. From the dome there extends a plurality of preferably four exit tubes to carry the hot combustion gases. In a compact arrangement, the four tubes equidistantly spaced on the dome are spirally interwrapped around the body of the combustor extending from the dome back toward the valve end. The four tubes are terminated 90° apart adjacent the valve end of the device providing for the discrete gas outlets from the combustor to be directed for example to a turbine. On the basis that the total area of the four tubes is equivalent to the area of a single tube leaving the combustor, it can be seen that the effective diameter of each tube would be approximately one half the diameter of the one single tube, thus being substantially smaller than a single tube from the combustor. This will, of course, provide for a significant decrease in the blade height of the turbine which is being started by the combustor. Furthermore, as can be seen, since the diameter of each tube is considerably smaller than a single tube, the effective diameter of the overall package having the tubes wrapped about the combustor is significantly smaller than one where a single tube were spiraled around the combustor. Additionally, it will be seen that four separate outlets are directing gas to the turbine, thus, significantly increasing the arc of admission of the gases to the turbine. In this first described embodiment, the diameter of the dome is equivalent to the diameter of the combustor. In the second embodiment the dome has a diameter larger than the combustor so as to have a mushroom-like appearance at the end of the combustor. In the portion of the dome in the second embodiment, which extends beyond the body of the combustor, the exit tubes are attached so as to leave the combustor in a direction initially parallel to the walls of the combustor as will be shown in more detail. The second arrangement provides for an extremely compact device as well as enlarging the effective combustion chamber area due to the increased volume within the mushroom dome. A further point of novelty is a utilization of blading on the starter turbine that permits a backflow of air therebetween as will be further explained. It is believed the invention will be better understood from the following detailed description and drawings in which:

FIG. 1 is a partially sectioned pictorial representation of a first embodiment of the novel combustor of the invention in combination with a starter turbine.

FIG. 2 is a front view taken along lines 2—2 of FIG. 1 showing the inlet valve of the combustor.

FIG. 3 is a sectional view taken along lines 3—3 of FIG. 2 showing the details of the valving arrangement.

FIG. 4 is a sectional view taken along lines 4—4 of FIG. 3 disclosing the construction of a portion of the valve in FIG. 3.

FIG. 5 is taken along lines 5—5 of FIG. 2 disclosing a portion of the valve structure.

FIG. 6 is a front view taken along lines 6—6 of FIG. 1 disclosing the injector portion of the device.

FIG. 7 is a partially-sectioned pictorial view of a second embodiment of the invention.

Figure 8:
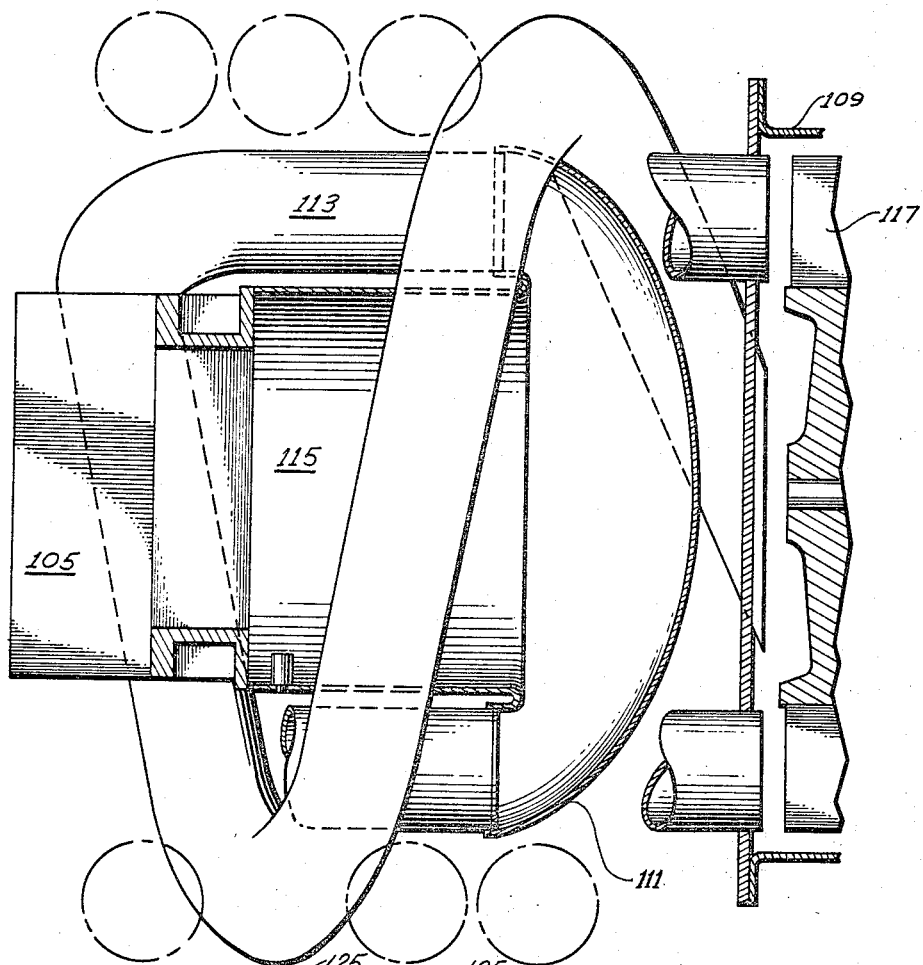
FIG. 8 is a partially sectioned pictorial view of a different arrangement of the device of FIG. 7 with regard to its position being in relation of the starter turbine.

Referring now to FIG. 1, there is seen the combustor 11 of this invention which is affixed to a turbine starter 13 of a conventional design. The combustor 11 is comprised of a cylindrical housing 15 which defines a combustion chamber 17. The front end of the housing 15 is provided with a flange portion 19. To the flange is affixed the injector 21 which is shown in more detail in FIG. 5, and will be explained therein. Upstream from the injector 21 is the valve 23. The valve 23 is secured by bolts 25 to the injector 21. The downstream end of the housing 15 is provided with a dome enclosure 27. Emanating from the dome are four equidistantly spaced exhaust tubes 29, 31, 33 and 35. The four tubes 29, 31, 33, and 35 emanate from the dome and are bent around toward the upstream end or injector end of the device. As can be seen, the four tubes are bent to completely encircle the housing 15 of the combustor in a spiraled manner. The diameter of each tube is approximately one-half the diameter of a normal combustor tube that would be required for a combustor of the same power output. In other words, the total cross-sectional area of the multiple tubes for the gases to exit from the combustor, would be equivalent to a single tube in a combustor having the same power. In a conventional combustor, the outlet tube normally has a diameter of approximately ½ to ¾ the diameter of the main body of the combustor. The four tubes terminate shortly after in a flat plate 37 forward of the valve 23 of the device. The rigid plate 37 has a plurality of openings 39 corresponding to the diameter of the various tubes, permitting the tubes to fit in the openings thereof. The tubes are welded or rigidly secured in a suitable manner to the plate at the openings. Since the plate 37 is of a heavy gage steel construction, it serves to support the entire combustor structure, which is generally quite light in weight. The plate 37 is affixed by bolts 41 to a cylindrical housing 43 for the starter turbine rotor and blades 45. The starter turbine is of a conventional construction having a rotor 47 and blades 49 affixed to a gear reduction pad 51 situated outside the housing 43 which in turn can be connected to the pad of the main turbine. As will be noted the height of blades 49 will correspond approximately to the diameter of the tubes as particularly seen by the relationship of tubes 29 and 33 to the blade height.

In order to explain the details of the inlet valve for the combustor, reference is now made to FIGS. 2, 3, 4, and 5. As shown in FIG. 2 the valve is comprised of two end plates 53 and 55. Long bolts 57 hold in stack array a series of elements. The elements comprise a plurality of vanes 59 separated by small metal spacers 61. Adjacent the stacked series of vanes 59 at each end of the valve are shims 63. Vane 59 as seen best in FIGS. 3 and 5 for convenience is comprised of two rectangular end portions 65 and 67 and has a plurality of ribs 69 equidistantly spaced between the end portion. The ribs 69 are supported by a cross member 71 extending between the two end portions. As can be seen particularly in FIG. 3, the support structure 71 comes to a tapered point 73 at the rearward portion thereof providing an aerodynamic surface. Disposed between each vane 59 are reed elements 75. As can be seen particularly in FIG. 4 the reed elements are made up of three layers. The reed elements are so thin that they are not separately seen in FIG. 2, but rather are shown as part of the spacers 61. The two outer layers 77 and 79 can be comprised for example of thin high temperature alloy such as beryllium-nickel. The inner layer can be of woven heat resistant fabric 81 which serves as an energy absorber between the two outer layers. The fabric 81 of the inner layer can be, for example, fiber glass impregnated with a phenolic. The reeds are flexible and serve to open and close according to the arrows shown in FIG. 3 when the combustor is operating. In a closed position as shown in FIG. 3 obviously no air would be admitted into the combustor. Upon opening to the dotted line position shown in FIG. 3, the flexible reeds then will admit air to the combustor. The operation will be explained in more detail when describing the operation of the combustor. The injector shown in more detail in FIG. 6 has a rectangular housing 76 which corresponds to the outer dimensions of the valve assembly 23 and is secured to the valve assembly as previously indicated by the bolts 25. In the base portion of the valve is a circular flange 77 which is secured by bolts 79 to the flange 19 of the main housing 15 of the combustor. The opposite corners of the housing 76 of the injector are tapped holes 81. Inlets 83 connect with the injector holes 81 and serve to supply the fuel to the injector from the fuel source not shown.

The system for feeding the fuel to operate the device of the invention does not form part of the herein inventive concept. Reference is had to the system shown and described in the previously described copending application which sets forth a typical method for feeding the fuel to the device and operating the spark to ignite the fuel. Particularly, the flow diagram of FIG. 1 of the previous application, though shown with reference to its utilization with two combustors, is obviously applicable for the operation and starting of the herein combustor. In order to operate the combustor, an initial supply of start air is required. As shown in the device of the prior referred to co-pending patent application, a ring may be disposed in the region of the fuel injector area. This ring is connected to an air supply and furnishes start air to the combustor which would be mixed with the fuel injected through the nozzles. This is not shown in the instant drawing since the start air can be brought in from any suitable source such as a ring located outside of the combustor body between the valve 23 and the turbine 45. The main point involved is that an initial amount of air is needed to be forced into the combustor to start it. Once combustion has been initiated, the combustor is then self-operating. When air is admitted to the combustion chamber through the valve, it can be seen that it enters through the vane 59 between the reeds 75 forcing the reeds to part to the dotted position, the air then passes through the injector area 21 in which the fuel is injected from the orifices 81. In the combustion chamber ignition of the fuel and air mixture is accomplished by a spark igniter 84. Leads, not shown, would carry an electrical charge from an ignition exciter to the spark igniter. As indicated in the co-pending application the ignition exciter could be of a capacitor discharge type and, for example, could produce approximately 30 sparks per second.

The basic cycle of the resonant combustor is essentially that of those of the prior art, namely combustion, hot gas expulsion, fresh air and fuel inflow and pre-compression. Combustion which takes place rapidly in the combustion chamber 15 causes the pressure therein to rise rapidly. This increased pressure causes gases to be forced out of the plurality of tail pipe tubes 29, 31, 33, and 35 at a high velocity. At the time of combustion, the high pressure additionally acts upon the reeds 75 of the valve in accord with the arrow shown to compress them towards each other and close the air inlet. The reeds 75 remain closed while the pressure is above atmospheric. As the hot gases continue to flow out of the tail pipes, an over expansion or rarefaction occurs in the combustion chamber 15. That is, the pressure level drops below atmospheric. When the combustion chamber pressure is below atmospheric, the ambient air will exert pressure on the inward side of the reeds forcing them open and allow a fresh charge of atmospheric air to enter. The air, as indicated, mixes with the fuel, which is being sprayed into the chamber continuously from the nozzles 81, to form a combustible mixture. Because of the rarefaction in the combustion chamber, gases surrounding the tail pipes rush into the tail pipe and flow back toward the combustion chamber. This back flow is essential to attain the pre-compression necessary for ignition of the next combustion cycle. The air that is admitted to the combustor will enter in the area between the front of the valve 23 and the port plate 37 which joins the assembly to the starter turbine.

Referring now to FIG. 7 wherein another embodiment of the invention is shown somewhat schematically, there can be seen a combustor 91 which is comprised of an inlet valve 93 of the same construction as that described with the previous embodiment and injector 95 of the same configuration as the previous embodiment. However, the combustion chamber arrangement 97 differs from that previously shown. As can be seen from the figure, the combustion chamber is comprised of a main cylindrical housing 99 which terminates at the end of the main combustion chamber area 97. It is disposed in a domed end enclosure 100 that has a base diameter greater than the diameter of the housing 97. As a result, the volume enclosed by the dome 100 together with the volume enclosed by a cylindrical housing 99 forms combustion chamber area equivalent to or larger than the volume in a straight cylinder combustion chamber as shown in the embodiment of FIG. 1. As can be seen, the total length of the combustion chamber is considerably shorter than that in FIG. 1, yet achieves within this short linear distance a total combustion chamber volume as large or larger than that of FIG. 1, further adding to the compactness of the device. The four exhaust tubes 101 emanate from the base portion and are spiraled about the body of the combustion chamber in the manner of the device shown in FIG. 1 and terminate at the starter turbine 103. It will be noted that there is a greater distance between the inlet valve 93 and the starter turbine 103 than in the embodiment of FIG. 1. This is due to the fact that for a given combustor volume, the exit tube must acoustically be of a length to achieve the desired combustor effect. As a result, though the combustion chamber has been considerably shortened, and the construction at the end portion has been made easier due to the joining of the tubes to a flat base portion of the dome, the total length of the individual tubes must be essentially equivalent to that shown in FIG. 1.

Referring now to FIG. 8, which utilizes the same principle of design of a combustor as shown in FIG. 7, it can be seen that in this embodiment the inlet valve 105 of the device is disposed away from the turbine assembly 109 such that the domed end 111 of the combustor is now adjacent the turbine. In this device, the combustor tubes 113 first traverse essentially the length of the combustor chamber 115 in a direction away from the domed end 111 toward the inlet valve 105. The tubes are then spirally wrapped around the combustor as shown in a direction back toward the turbine blades 117. As can be seen, this arrangement makes for an extremely compact device whose overall length is considerably shorter than that shown in FIG. 7. Additionally, this arrangement provides for a completely unimpeded and uncontaminated air inlet for valve 105 since it no longer faces the turbine blades. Thus, as can be seen, through the arrangement in this embodiment, the overall length of tubes 113 is equivalent to the length of tubes as shown in FIG. 7, yet provides a more compact device.

As previously indicated, one of the major advantages of this invention relates to increasing the efficiency of the starter turbine. It is well-known that the efficiency of a partial admission turbine is increased as the arc of admission is increased. This has been demonstrated previously and is now well-known in the art. It had been shown that energy losses can be expressed as a function of the arc of admission. To illustrate the effect, attention is drawn to blade pumping losses. Thus, rotor blades which are in the inactive portion of the admission arc are using up energy by acting as pumps to recirculate the inactive fluid within the turbine housing. As the amount of inactive arc is increased, the amount of energy loss in this pumping is increased. Additionally, as was indicated, blade height affects the efficiency of the turbine. In a similar manner, as previously described, decreased blade height decreases blade pumping losses in a partial admission turbine.

The fuels utilized to operate a resonant combustor are well-known in the art, and any such fuel can be successfully used in the instant application. Thus, the fuels contemplated are both gaseous and liquid and lie within the range of most all hydrocarbon fuels. Examples of such fuels would be gasoline, JP–5, natural gas, and propane and the like.

The starter turbine utilized in conjunction with the novel combustor of the invention is of standard design, except for the type of blading utilized. It has been found that maximum power operation of the combustor requires a backflow of air into the exhaust tube. Generally for best power output the exhaust tube should be cut off at an angle and placed almost against the blade inlets. In other words, the exhaust tubes will terminate adjacent the leading edge of the turbine blades. As can be seen, backflow then must take place through the rotor blades, since there is no other source for this working fluid. It has been found that for maximum operation, the blades must provide a minimum resistance to such backflow. Another advantage is that torque is actually produced by the backflow which results in even more power. In order to achieve such desired backflow, the blades should be designed as essentially shown in FIGS. 9 and 10. As seen particularly in FIG. 10, the blades 121 are essentially symmetrical to an axis X—X which lies in a plane passing through the center of the turbine wheel. Additionally, the blades should be provided with a constant passage width Y therebetween. This blade design is generally not best for most turbine applications where an unsymmetrical blade with varying, normally decreasing, passage width is found.

Figures 9, 10:
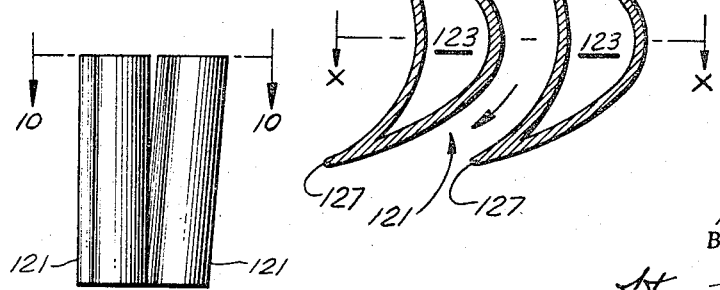
FIG. 9 is a perspective view of two blades used on the starter turbine.
FIG. 10 is a top view of the blades of FIG. 9 taken along line 10—10.

As shown in FIG. 10, the particular blade 121 can have an essentially hollow inner core 123 which provides for better relief of thermal stress. The particular blades as shown are not exactly symmetrical about the X—X axis. The arrows between the blades indicate the normal flow of hot gases from the turbine through the blades. Thus, the leading edge 125 as shown in the particular blade design is not quite as extended as the trailing edge 127. However, the particular blades would be considered in the art to be essentially symmetrical about the X—X axis, and, in fact, blades that are exactly symmetrical will suffice for the desired backflow necessary to operate the turbine at maximum efficiency.

Although the invention has been described and illustrated in detail, it is to be clearly understood that the same is by way of illustration and example only and is not to be taken by way of limitation, the spirit and scope of this invention being limited only by the terms of the appended claims.

We claim:
1. In combination:
   a starter turbine,
   a resonant combustor disposed adjacent said turbine such that the hot gas output of said combustion is directed upon the blades of said turbine, said combustor comprising:
   a cylindrical housing, an air inlet valve disposed at one end of said housing, means for injecting fuel disposed in said housing adjacent said inlet valve, a combustion chamber within said housing in direct communication with said air inlet valve and said fuel injection means, means for effecting combustion in said chamber, and at least two gas exhaust tubes extending from the other end of said housing, said tubes being of acoustical length and spirally wound about a portion of the housing.

2. The combination of claim 1 wherein the tubes are wound to extend from the second end of said combustor past said first end.

3. The combination of claim 2 wherein said tubes emanate from a domed enclosure enclosing the second end of said housing.

4. The combination of claim 3 wherein the base of said dome corresponds to the diameter of said housing.

5. The combination of claim 3 wherein the base of said dome is of a diameter greater than said housing with means connecting said base to said housing to form an enclosed end, and said tubes emanate from said means connecting said dome to said housing.

6. The combination of claim 5 wherein said tubes first traverse the housing parallel to the axis thereof from the domed end to the valve end, said tubes then being spirally wound about said housing back toward the domed end thereof.

7. In combination:

a starter turbine having blades that permit a backflow of air therebetween, a resonant combustor disposed adjacent said turbine such that the hot gas output of said combustion is directed upon the blades of said turbine, said combustor comprising:

a cylindrical housing, an air inlet valve disposed at one end of said housing, means for injecting fuel disposed in said housing adjacent said inlet valve, a combustion chamber within said housing in direct communication with said air inlet valve and said fuel injection means, means for effecting combustion in said chamber, and at least two gas exhaust tubes extending from the other end of said housing, said tubes being of acoustical length and spirally wound about a portion of the housing.

8. The combination of claim 7 wherein the turbine blading has a constant passage width between adjacent blades.

9. The combination of claim 7 wherein the blades of said turbine are approximately symmetrical about an axis lying in a plane passing through the center of the turbine wheel.

References Cited

UNITED STATES PATENTS

| | | | |
|---|---|---|---|
| 1,278,499 | 9/1918 | Esnault-Pelterie | 60—39.51 XR |
| 2,504,414 | 10/1944 | Hawthorne | 60—39.36 XR |
| 2,908,135 | 10/1959 | King et al. | 60—39.36 |
| 3,079,755 | 3/1963 | Forney | 60—39.46 XR |

JULIUS E. WEST, *Primary Examiner.*